US006443476B1

United States Patent
Molock, Jr.

(10) Patent No.: US 6,443,476 B1
(45) Date of Patent: Sep. 3, 2002

(54) COVERING FOR FIFTH WHEEL OF A TRACTOR TRAILER

(76) Inventor: Rudolph O Molock, Jr., 404 E. Ring Factory Rd., Belair, MD (US) 21014

( * ) Notice: Subject to any disclaimer, the term of this patent is extended or adjusted under 35 U.S.C. 154(b) by 0 days.

(21) Appl. No.: 09/945,958

(22) Filed: Sep. 4, 2001

(51) Int. Cl.⁷ .................................................. B60D 1/60
(52) U.S. Cl. ........................ 280/507; 280/433; 150/166
(58) Field of Search .............................. 280/423.1, 433, 280/507, 504; 150/166

(56) References Cited

U.S. PATENT DOCUMENTS

| | | | | |
|---|---|---|---|---|
| 4,216,990 A | * | 8/1980 | Musgrove et al. | 296/213 |
| 4,832,359 A | * | 5/1989 | Rafi-Zadeh | 280/423.1 |
| 5,056,856 A | * | 10/1991 | Pederson | 296/100 |
| 5,303,947 A | * | 4/1994 | Gerber | 280/423.1 |
| 6,092,974 A | * | 7/2000 | Roth | 414/526 |

* cited by examiner

Primary Examiner—Avraham Lerner
(74) Attorney, Agent, or Firm—Michael I. Kroll

(57) ABSTRACT

A device for covering a fifth wheel on a frame of a tractor. The covering device includes a tarpaulin and a storage device positioned on a first side of the frame for storing the tarpaulin when a semi-trailer is connected to the fifth wheel. The tarpaulin is held in a position above the fifth wheel by an elevating device upon removal of the tarpaulin from the storing device and into an extended position. A device is connected to the frame on a side of the fifth wheel opposite the storing device for selectively retaining the tarpaulin in an extended position above the elevating device and covering the fifth wheel. The covering device blocks dirt from contacting the fifth wheel and maintains the fifth wheel in a well lubricated state after the semi-trailer is removed thereby increasing the life of the fifth wheel. The cover also eliminates the possibility of a water and grease mixture normally caused by the greasy fifth wheel being exposed on a rainy day forming on the ground beneath the tractor.

13 Claims, 5 Drawing Sheets

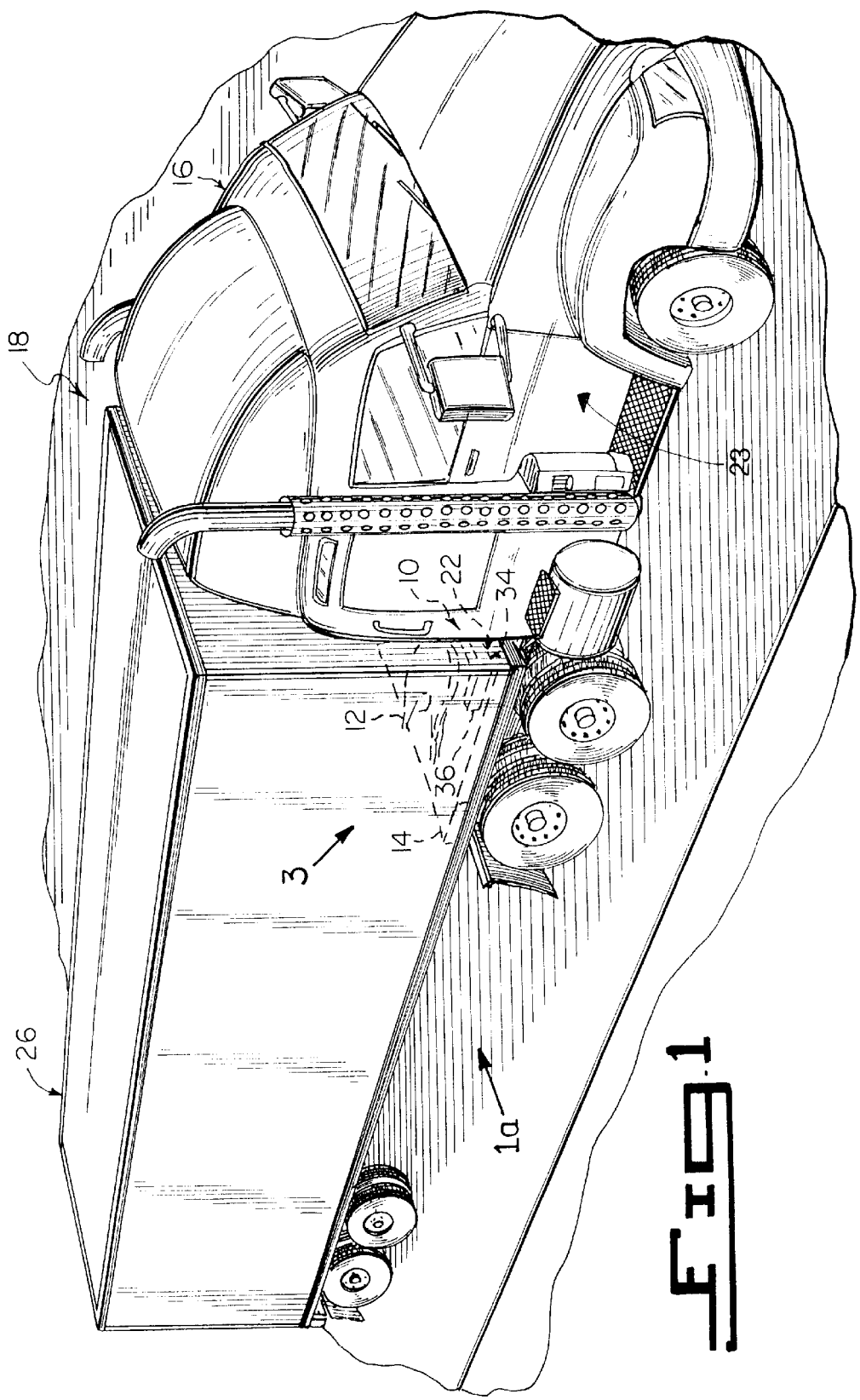

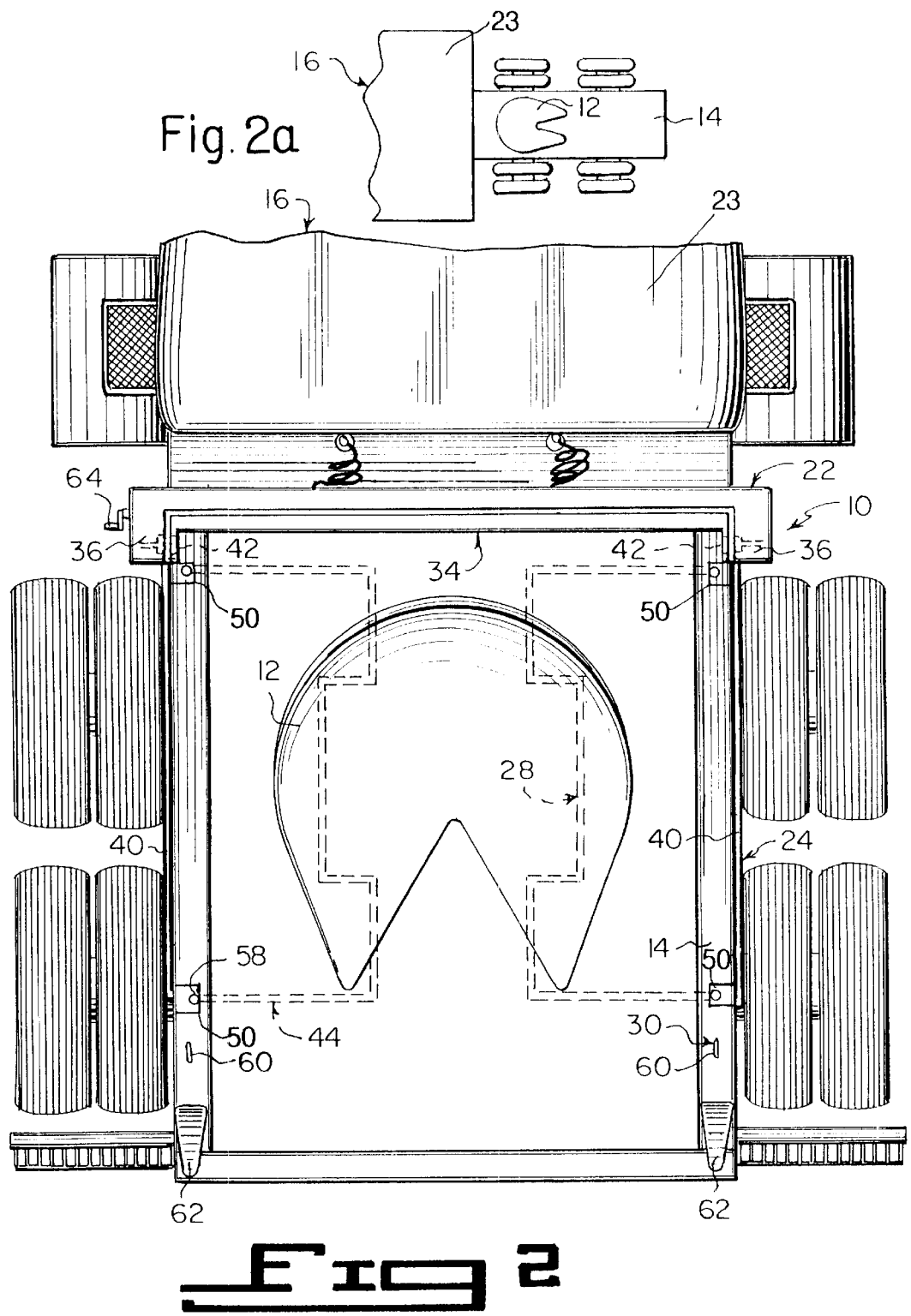

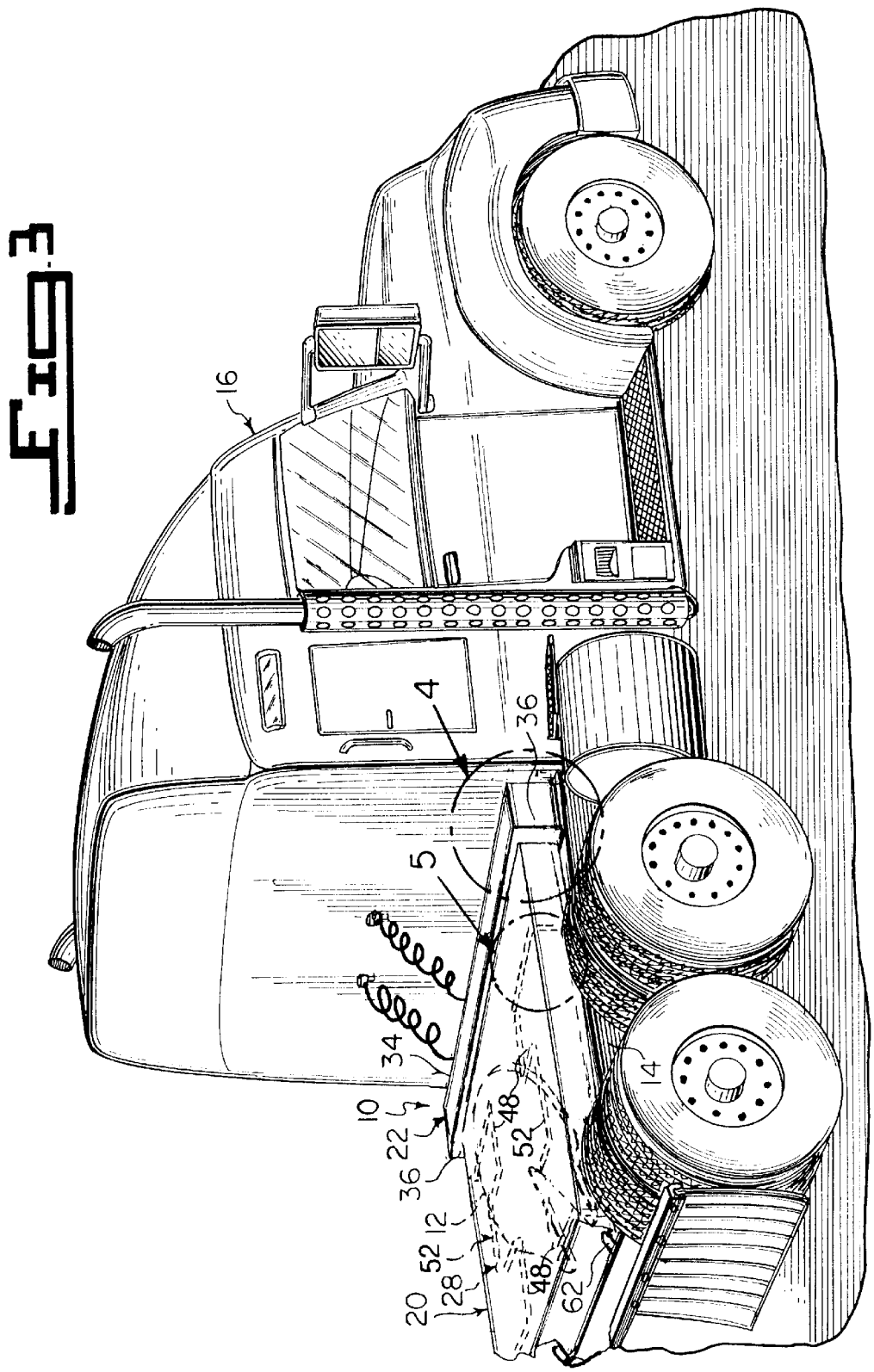

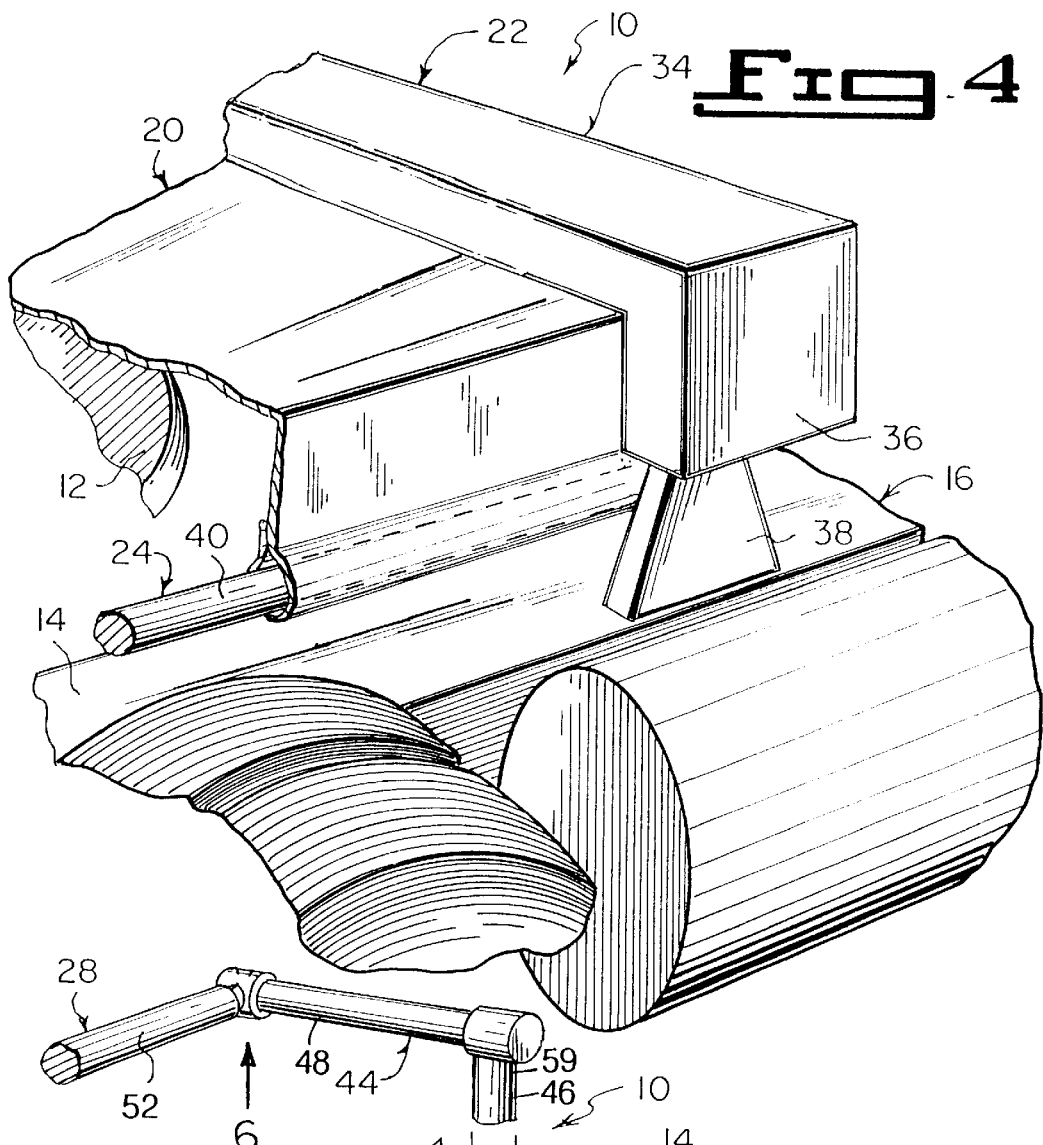
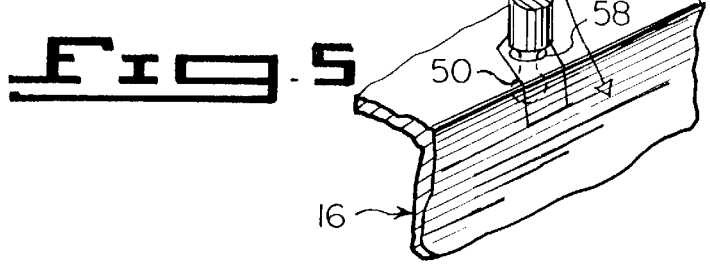

COVERING FOR FIFTH WHEEL OF A TRACTOR TRAILER

BACKGROUND OF THE INVENTION

1. Field of the Invention

The present invention relates generally to large transport trucks and, more specifically, to a device for covering a fifth wheel on a frame of a tractor of a large transport truck when a trailer is not connected thereto. The covering device blocks dirt from Contacting the fifth wheel and maintains the fifth wheel in a well lubricated state after the semi-trailer is removed thereby the life of the fifth wheel. The cover also eliminates the possibility of a water and grease mixture normally caused by the greasy fifth wheel being exposed on a rainy day forming on the ground beneath the tractor.

2. Description of the Prior Art

Numerous large articulated transport trucks have been provided in the prior art. Articulated trucks are composed of two or more units joined together. Large transport trucks consist of a tractor and at least one semi-trailer. The tractor acts as the power unit as the engine is situated therein and includes the transmission, brake-control system, fuel tank, and the cab in which the driver sits. The semi-trailer is hitched onto the tractor. A semi-trailer has wheels only under the rear end. A second trailer is sometimes attached to the first trailer and includes wheels under both front and rear ends. To support the semi-trailer when detached from the tractor, there may be small fold-up wheels called dollies or a strong metal support bar positioned at the front end.

In large transport trucks the tractor portion of the truck includes a disk, known popularly as a fifth wheel, located on a horizontal platform extending over its rear wheels. A pin located under the front of the semi-trailer locks into the disk for attaching the semi-trailer to the tractor while the platform provides support for the front end of the semi-trailer. Thus, the semi-trailer is able to be quickly detached from the tractor by disconnecting the connection with the pin. This allows the tractor to connect with and haul a second semi-trailer while the first semi-trailer is being unloaded.

The tractor includes the fifth wheel and may have rear dual wheels mounted on a single axle, or tandem axles depending on the usage. The semi-trailer is a vehicle designed to be pulled by the tractor. It has either single or tandem axles on the rear. A steel plate on which the welded or molded pin is located on the bottom front end of the semi-trailer slips and locks into the fifth wheel of the tractor thereby connecting the tractor and semi-trailer.

SUMMARY OF THE PRESENT INVENTION

The present invention relates generally to large transport trucks and, more specifically, to a device for covering the fifth wheel on the frame of a tractor portion of a large transport truck when a semi-trailer is not connected to the tractor portion. The covering device blocks dirt from contacting the fifth wheel and maintains the fifth wheel in a well lubricated state after the semi-trailer is removed thereby increasing the life of the fifth wheel. The covering device also eliminates the possibility of a water and grease mixture forming on the ground beneath the tractor normally caused when the greasy fifth wheel is exposed to water such as on a rainy day.

A primary object of the present invention is to provide a device for covering a fifth wheel of a tractor portion of a large transport truck that will overcome the shortcomings of the prior art devices.

Another object of the present invention is to provide device for covering a fifth wheel of a tractor portion of a large transport truck including a tarpaulin acting to block dirt from contacting the fifth wheel and maintaining the fifth wheel in a well lubricated state when a semi-trailer is not connected thereto thereby increasing the life of the fifth wheel.

An additional object of the present invention is to provide device for covering a fifth wheel of a tractor portion of a large transport truck wherein the tarpaulin will, in its extended position, eliminate the forming of a water and grease mixture on the ground under the tractor caused by the greasy fifth wheel being exposed to water such as on a rainy day.

A further object of the present invention is to provide device for covering a fifth wheel of a tractor portion of a large transport truck that is simple and easy to use.

A still further object of the present invention is to provide device for covering a fifth wheel of a tractor portion of a large transport truck that is economical in cost to manufacture.

Further objects of the invention will appear as the description proceeds.

A device for covering a fifth wheel on a frame of a tractor is disclosed by this application. The covering device includes a tarpaulin and a storage device positioned on a first side of the frame for storing the tarpaulin when a semi-trailer is connected to the fifth wheel. The tarpaulin is held in a position above the fifth wheel by an elevating device upon removal of the tarpaulin from the storing device and into an extended position. A device is connected to the frame on a side of the fifth wheel opposite the storing device for selectively retaining the tarpaulin in an extended position above the elevating device and covering the fifth wheel. The covering device blocks dirt from contacting the fifth wheel and maintains the fifth wheel in a well lubricated state after the semi-trailer is removed thereby increasing the life of the fifth wheel. The cover also eliminates the possibility of a water and grease mixture normally caused by the greasy fifth wheel being exposed on a rainy day forming on the ground beneath the tractor.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of a large transport truck including a tractor and semi-trailer connected together and the device for covering a fifth wheel of a tractor portion of a large transport truck of the present invention shown in dashed lines in an unextended position;

FIG. 2 is a top view of the horizontal platform of the large transport truck including the device for covering a fifth wheel of the present invention taken in the direction of arrow 2 in FIG. 1a;

FIG. 2a is a top view of the horizontal platform of the large transport truck showing the fifth wheel;

FIG. 3 is a side perspective view of the large transport truck including the device for covering a fifth wheel of the present invention taken in the direction of arrow labeled 3 in FIG. 1, with the fifth wheel shown in dashed lines and the tarpaulin in its extended position over the fifth wheel;

FIG. 4 is an enlarged perspective view in partial cross-section of a portion of the device for covering a fifth wheel of the present invention within the circle labeled 4 in FIG. 3; and FIG. 5 is an enlarged side perspective view of a portion of the device for covering a fifth wheel of the present invention within the circle labeled 5 in FIG. 3.

LIST OF REFERENCE NUMERALS

Figure 1A:
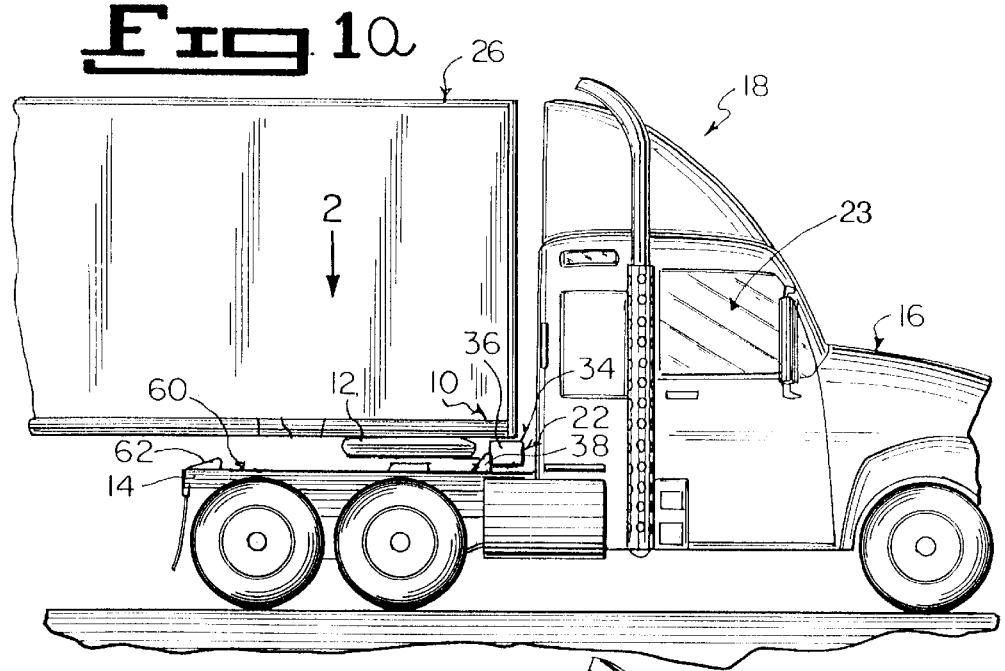
FIG. 1a is a side view of the large transport truck including the device for covering a fifth wheel of the present invention taken in the direction of arrow 1a in FIG. 1.

Turning now descriptively to the drawings, in which similar reference characters denote similar elements throughout the several views, the Figures illustrate the device for covering a fifth wheel of the present invention. With regard to the reference numerals used, the following numbering is used throughout the various drawing figures.

10 device for covering a fifth wheel of the present invention
12 fifth wheel on frame of tractor
14 frame of tractor
16 tractor of large transport truck
18 large transport truck
20 tarpaulin of covering device
22 storage facility of covering device
23 cab of tractor
24 guide assembly of covering device
26 semi-trailer of large transport truck
28 elevating assemblage of covering device
34 generally rectangular box-shaped housing of storage facility
36 right angle side extension end of rectangular box-shaped housing
38 base support of rectangular box-shaped housing
40 fixed guide rail of guide assembly
42 guide roller
44 swivel support structure of elevating assemblage
46 pivotal support rod of swivel support structure
48 right angle extending bar
50 recess in frame
52 connecting bar
58 first end of pivotal support bar
59 second end of pivotal support bar
60 pair of hooks for retaining tarpaulin in extended position
62 pair of ramps of frame
64 crank handle on rectangular box-shaped housing

DETAILED DESCRIPTION OF THE PREFERRED EMBODIMENT

Turning now descriptively to the drawings, in which similar reference characters denote similar elements throughout the several views, FIGS. 1 through 5 illustrate the device for covering a fifth wheel of the present invention indicated generally by the numeral 10.

FIG. 1 illustrates a large transport truck 18 including a tractor 16 with a semi-trailer 26 connected thereto. The tractor 16 includes a fifth wheel 12 illustrated in dashed lines for connecting the semi-trailer 26 thereto. The fifth wheel 12 is positioned on a frame 14 of the tractor 16. The covering device 10 is also illustrated in dashed lines and acts to cover the fifth wheel 12 when the semi-trailer 26 is not connected to the tractor 16. The covering device 10 includes a tarpaulin 20 and a storage facility 22 for storing the tarpaulin 20 therein. The storage facility 22 includes a generally rectangular box-shaped housing 34 and an extension 36 on either side of the box-shaped housing 34, each extension 36 extending substantially at a right angle from a respective side of the box-shaped housing 34 and over the sides of the frame 14. The box-shaped housing 34 extends transversely along the frame 14 of the tractor 16 and is positioned between the fifth wheel 12 and the cab 23 of the tractor 16.

Figure 1B:
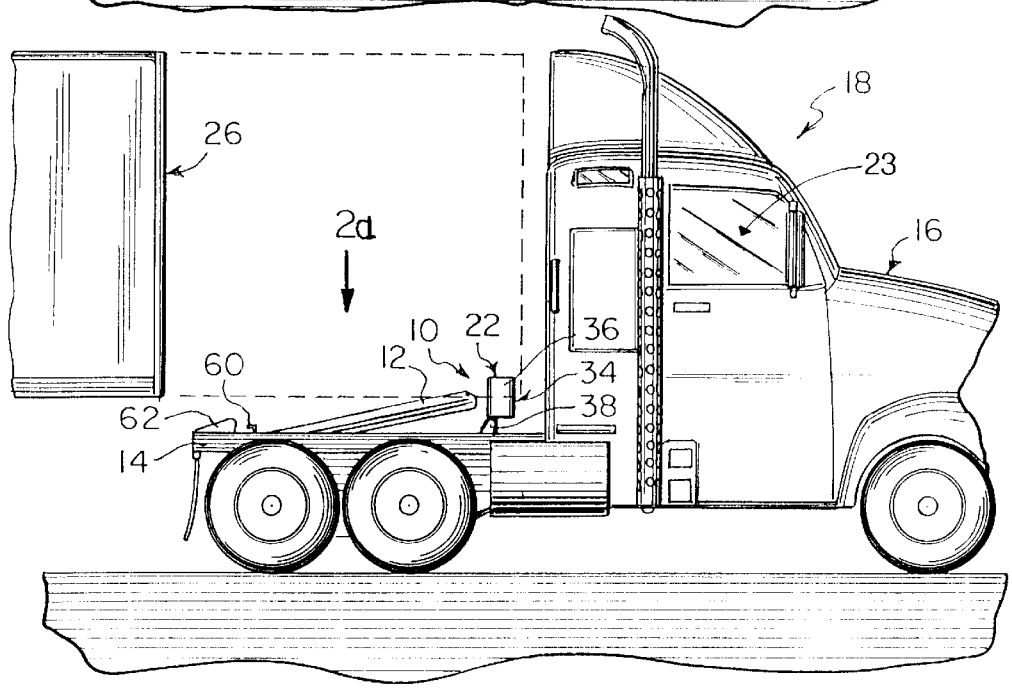
FIG. 1b is a side view of the large transport truck including the device for covering a fifth wheel of the present invention showing the semi-trailer in phantom;.

A side view of the transport truck 18 is illustrated in FIGS. 1a and 1b. FIG. 1a illustrates the transport truck 18 with the semi-trailer 26 attached to the tractor 16 and FIG. 1b illustrates the semi-trailer 26 being removed from its connection to the tractor 16. A guide assembly 24 is mounted to the sides of the frame 14 and is provided for directing the tarpaulin 20 out of the storage facility 22 and over the fifth wheel 12 to cover the fifth wheel 12 after a forward end of a semi-trailer 26 of the large transport truck 18 is removed. The storage facility 22 is mounted on a base support 38 connected to the frame 14. Each base support 38 is mounted onto the frame 14 and is pivotally attached under one right angle extension 36 of the storage facility 22, so as to allow the generally box-shaped housing 34 to pivot downwardly onto the frame 14, when the forward end of the semi-trailer 26 of the large transport truck 18 is removed away from the fifth wheel 12.

Positioned on a side of the fifth wheel 12 opposite the storage facility 22 is a pair of hooks 60 (only one of the hooks 60 is visible from this view) for engaging the tarpaulin 20 and holding the tarpaulin 20 in place covering the fifth wheel 12 as will be explained hereinafter. A pair of hooks 60 is illustrated for purposes of example only. In practice any number of hooks 60 as desired may extend from the frame 14 for connection to and retaining of the tarpaulin 20 in its extended position when a semi-trailer 26 is not connected to the fifth wheel 12. A pair of small ramps 62 is also mounted onto a side of the frame 14 adjacent to and rearward from each hook 60. The pair of ramps 62 allow the forward end of the semi-trailer 26 to slide up and over the hooks 60 and swivel support structures 44 of the fifth wheel 12 when connecting the semi-trailer 26 with the fifth wheel 12 thereby preventing damage to the hooks 60 and swivel support structures 44.

FIGS. 2 and 2a illustrate a top view of the frame 14 of the tractor 16. FIG. 2a illustrates the positioning of the fifth wheel 12 on the frame 14 of the tractor 16 without the covering device 10 connected thereto and FIG. 2 shows a more detailed view of the frame 14 including the covering device 10 positioned thereon. As can be seen from FIGS. 2 and 2a, the fifth wheel 12 is substantially centrally positioned on a topside of the frame 14. FIG. 2 shows the storage facility 22 positioned between the fifth wheel 12 and the cab 23 of the tractor 16. An elevating assemblage 28 is provided for maintaining the tarpaulin 20 in an elevated position above the fifth wheel 12 when extended to cover the fifth wheel 12. The elevating assemblage 28 is illustrated in dashed lines and is pivotally connected to the frame 14. The elevating assemblage 28 may be pivoted to extend partially over the fifth wheel 12 when a semi-trailer 26 is not connected thereto. Extending into the frame 14 for establishing a pivotal connection with the elevating assemblage 28 are a plurality of recesses 50. The elevating assemblage 28 pivotally connects with the plurality of recesses 50 as will be described in more detail with specific reference to FIG. 5.

A crank handle 64, as shown in FIG. 2, is positioned to extend from one end of the storage facility 22 for use in rolling the tarpaulin 20 back into the storage facility 22 after use. When the tarpaulin 20 is extended and engaged with the hooks 60, the crank handle 64 can be rotated in a counterclockwise direction to apply tension onto the tarpaulin 20 and thereby eliminate any wrinkles and slack forming in the tarpaulin 20 upon removal from the storage facility 22 and form a tight flat surface covering for the fifth wheel 12. When the tarpaulin 20 is removed from engagement with the hooks 60, the crank handle 64 is rotated further in a counterclockwise direction causing the tarpaulin 20 to be rolled up within the box-shaped housing 34 for storage therein.

The covering device 10 is illustrated in FIG. 3 with the tarpaulin 20 in its extended position covering the fifth wheel 12. As can be seen from this figure, the tarpaulin 20 extends from the storage facility 22 and completely covers the fifth wheel 12. The tarpaulin 20 is an elongate waterproof sheet 32 having a bend at either side edge so as that the side edges extend substantially perpendicular to the mid section of the tarpaulin 20 and along the right angle side extension ends 36 on either side of the box-shaped housing 34. The elevating assemblage 28 is illustrated in dashed lines and is pivoted to partially overlap the fifth wheel 12 when the tarpaulin 20 is to be extended. The elevating assemblage 28 sits beneath the tarpaulin 20 and acts to hold the tarpaulin 20 above and separated from the fifth wheel 12.

FIG. 4 illustrates a partial cross-sectional view of the tarpaulin 20 in its extended position. In this position, the tarpaulin 20 is directed over the elevating assemblage 28 and fifth wheel 12 by a directing assembly 24. The directing assembly 24 consists of a pair of fixed guide rails 40. Each fixed guide rail 40 extends from the right angle side extension ends 36 of the box-shaped housing 34 past the fifth wheel 12 and is mounted to a side of the frame 14 such that the side edges of the tarpaulin 20 ride along the fixed guide rails 40 when being extended to cover the fifth wheel 12. As the right angle extensions 36 extend out past the sides of the frame 14, the tarpaulin 20 is caused to extend over the sides of the frame 14 thereby completely covering the frame 14 and preventing the fifth wheel 12 from being exposed to the elements.

The directing assembly 24 further contains a pair of guide rollers 42 as can be seen in FIG. 2. Each pair of guide rollers 42 are rotatably carried within each right angle extension 36 of the box-shaped housing 34 and act to engage with and aid in the extending of the side edges of the tarpaulin 20 from the box-shaped housing 34.

FIG. 5 illustrates the elevating assemblage 28 which includes a pair of swivel support structures 44 pivotally mounted within the recesses 50 on the frame 14 of the tractor 16 on opposing sides of the fifth wheel 12. Each swivel support structure 44 includes a pair of pivotal support bars 46, each pivotal support bar 46 being pivotally mounted at a first end 58 thereof within a respective one of the plurality of recesses 50. Connected to and extending at a right angle from a second end 59 of each pivotal support bar 46 is an extension bar 48. The extension bars 48 are connected together by a connecting bar 52 to form each swivel support structure 44. Only one end of the swivel support structure 44 is illustrated in the figure. However, it is to be realized that the opposing end of the swivel support structure 44 is similar in construction and is similarly connected to the frame 14 as is illustrated and described and thus further description is not provided. When the swivel support structures 44 are pivoted into and locked in a position partially extending over the fifth wheel 12, the tarpaulin 20 may be guided into and retained in its extended position thereover.

The operation of the covering device 10 of the present invention will now be described with reference to the drawings. In operation, the covering device 10 is positioned on a topside of a frame 14 of a tractor 16 such that the tarpaulin 20 and storage facility are positioned between the fifth wheel 12 and the cab 23 of the tractor 16. The guide rails 40 are positioned to extend from the extending sides 36 of the storage facility and along the sides of the frame 14, connected to a side of the frame 14 at an end opposite the storage facility 22. A number of pins 60 for engaging the tarpaulin 20 are positioned to extend from the top side of the frame 14 on a side of the fifth wheel opposite the storage facility 22. A pair of ramps 62 is also positioned on the topside of the frame 14 such that the pins 60 are positioned between the pair of ramps 62 and the fifth wheel 12. A pair of elevating assemblages 28 are pivotally connected to the frame 14 and able to pivot between a first position partially covering the fifth wheel 12 and a second position not extending over the frame 14.

When a semi-trailer 26 is connected to the tractor 16, the elevating assemblies 28 are in the second position and the tarpaulin 20 is positioned within the storage facility 22. When the semi-trailer 26 is removed from its position connected to the frame 14, the elevating assemblies 28 are pivoted into the first position partially covering the fifth wheel 12 and the tarpaulin 20 is removed from the storage facility 22. The tarpaulin 20 is guided along the guide rails 40 and atop the elevating assemblies until it covers the fifth wheel 12. At this time the tarpaulin 20 is completely extended. The tarpaulin 20 is now engaged with the pins 60 which retain the tarpaulin 20 in this extended position. The crank 64 is then turned in a counterclockwise direction applying a force on the tarpaulin 20 in a direction back into the storage facility 22 thereby removing any slack in the tarpaulin 20. The tarpaulin 20 remains in this position covering and protecting the fifth wheel 12 until it is desired to connect a semi-trailer 26 to the fifth wheel 12.

At this time the tarpaulin 20 is released from its engagement with the pins 60 and the crank 64 is turned in the counterclockwise direction causing the tarpaulin 20 to be pulled back into the storage facility 22. The elevating assemblies 28 are then pivoted into the second position and the tractor 16 is ready to receive the semi-trailer 26. The semi-trailer 26 is then slid over the ramps 64 causing the semi-trailer to avoid contacting and possibly damaging the pins 60 and on to the frame 14. The semi-trailer 26 is then connected to the fifth wheel 12 and the transport truck is ready to travel. This procedure is repeated each time the semi-trailer 26 is removed from its connection to the fifth wheel 12.

From the above description it can be seen that the device for covering a fifth wheel of a tractor portion of a large transport truck of the present invention is able to overcome the shortcomings of prior art devices by providing a device for covering a fifth wheel of a tractor portion of a large transport truck including a tarpaulin acting to block dirt from contacting the fifth wheel and maintaining the fifth wheel in a well lubricated state when a semi-trailer is not connected thereto thereby increasing the life of the fifth wheel and eliminate the forming of a water and grease mixture on the ground under the tractor caused by the greasy fifth wheel being exposed to water such as on a rainy day. Furthermore, the device for covering a fifth wheel of the present invention is simple and easy to use and economical in cost to manufacture.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A device for covering a fifth wheel on a frame of a tractor, said covering device comprising:
   a) a tarpaulin;
   b) means positioned on a first side of the frame for releasably storing said tarpaulin therein when a semi-trailer is connected to the fifth wheel;
   c) means for elevating said tarpaulin above the fifth wheel upon release of said tarpaulin from said storing means and into an extended position;
   d) means connected to the frame on a side of the fifth wheel opposite said storing means for selectively retaining said tarpaulin in an extended position above the elevating means and covering the fifth wheel.

2. A covering device as recited in claim 1, wherein said storing means includes an elongate housing and first and second extensions, each extension extending substantially at a right angle from a respective end of said elongate housing and overlapping a side of the frame.

3. A covering device as recited in claim 2, further comprising a base support, connected between said storing means and the frame for allowing said elongate housing to pivot downwardly onto the frame when the semi-trailer is removed away from the fifth wheel.

4. A covering device as recited in claim 1, further comprising means for directing said tarpaulin out of said storing means and above said elevating means for engagement with said retaining means.

5. A covering device as recited in claim 4, wherein said directing means includes a pair of fixed guide rails, each fixed guide rail extending from each of said right angle extension sides and along a side of said frame, said tarpaulin riding along said fixed guide rails upon removal from said storing means.

6. A covering device as recited in claim 5, wherein said directing means further includes two pair of guide rollers, each pair of guide rollers being rotatably carried within a respective one of said right angle extension sides for engaging with and aiding removal of said tarpaulin from said storage means.

7. A covering device as recited in claim 1, wherein said elevating means is pivotally connected to said frame.

8. A covering device as recited in claim 7, includes a pair of swivel support structures pivotally mounted on the frame on opposing sides of the fifth wheel, said swivel support structures being movable between a first position partially extending over the fifth wheel for elevating said tarpaulin above the fifth wheel when said tarpaulin is removed from said storage means and a second position extending from a side of the frame when said tarpaulin is stored within said storage means.

9. A covering device as recited in claim 8, wherein each said swivel support structure includes:
   a) a pair of support rods pivotally connected to the frame;
   b) first and second bars, each connected to extend substantially perpendicularly from a respective one of said support rods; and
   c) a connection bar connected between said first and second bars.

10. A covering device as recited in claim 1, wherein said retaining means includes at least one hook, said hook extending from the frame on a side of the fifth wheel opposite said storing means for engaging with and retaining said tarpaulin in position when removed from said storing means.

11. A covering device as recited in claim 10, further including at least one ramp mounted on the frame adjacent to said at least one hook for raising the semi-trailer over said at least one hook upon connection to the fifth wheel on the frame of the tractor.

12. A covering device as recited in claim 10, wherein said storing means further includes means for returning said tarpaulin back into said elongate housing.

13. A covering device as recited in claim 12, wherein said returning means is a crank handle extending from said elongate housing, said crank handle causing said tarpaulin to be rolled into said elongate housing upon rotation thereof.

* * * * *